United States Patent
Namie et al.

(10) Patent No.: US 8,605,174 B2
(45) Date of Patent: Dec. 10, 2013

(54) APPARATUS, METHOD, AND SYSTEM OF IMAGE PROCESSING, AND RECORDING MEDIUM STORING IMAGE PROCESSING CONTROL PROGRAM

(75) Inventors: Kenji Namie, Kanagawa (JP); Haruo Shida, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 44 days.

(21) Appl. No.: 13/443,305

(22) Filed: Apr. 10, 2012

(65) Prior Publication Data
US 2012/0293692 A1 Nov. 22, 2012

(30) Foreign Application Priority Data

May 20, 2011 (JP) ................................ 2011-113130
Mar. 22, 2012 (JP) ................................ 2012-064984

(51) Int. Cl.
*H04N 5/217* (2011.01)
*H04N 7/14* (2006.01)
*H04N 5/225* (2006.01)
*H04N 5/232* (2006.01)
*H04N 5/228* (2006.01)
*G06K 9/40* (2006.01)

(52) U.S. Cl.
USPC ................... 348/241; 348/14.08; 348/207.1; 348/211.14; 348/222.1; 348/373; 382/275

(58) Field of Classification Search
USPC ....... 348/14.01–14.16, 207.1, 211.99–211.3, 348/211.14, 222.1, 241, 373–376; 382/254–275; 396/419–428
See application file for complete search history.

(56) References Cited

U.S. PATENT DOCUMENTS

| 4,939,580 | A | * | 7/1990 | Ishikawa et al. | 348/373 |
| 5,374,971 | A | * | 12/1994 | Clapp et al. | 348/376 |
| 5,550,588 | A | | 8/1996 | Hayashi | |
| 5,978,028 | A | * | 11/1999 | Yamane | 348/373 |
| 6,540,415 | B1 | * | 4/2003 | Slatter et al. | 396/428 |
| 6,549,230 | B2 | * | 4/2003 | Tosaya | 348/14.08 |
| 6,965,460 | B1 | * | 11/2005 | Gann et al. | 358/471 |

(Continued)

FOREIGN PATENT DOCUMENTS

DE 196 53 981 A1 6/1997
EP 1 259 059 A2 11/2002

(Continued)

OTHER PUBLICATIONS

Extended European Search Report issued Aug. 17, 2012 in Patent Application No. 12165833.0.

*Primary Examiner* — Michael Osinski
(74) *Attorney, Agent, or Firm* — Oblon, Spivak, McClelland, Maier & Neustadt, L.L.P.

(57) ABSTRACT

An image processing apparatus includes a camera, a support body, and an arm section including an arm that is rotatably attached to the support body and to a camera housing incorporating therein the camera. The image processing apparatus calculates a height of the camera measured from a set surface, using dimensional information of the image processing apparatus and inclination information indicating an inclination of the camera and an inclination of the arm. The image processing apparatus specifies a type of an object subjected for capturing by the camera using at least the height of the camera, and applies image processing specific to the specified type of the object to a captured image captured by the camera.

16 Claims, 11 Drawing Sheets

(56) References Cited

U.S. PATENT DOCUMENTS

| | | |
|---|---|---|
| 7,053,939 B2 * | 5/2006 | Lin et al. .................. 348/239 |
| 7,397,504 B2 * | 7/2008 | Cutler ....................... 348/239 |
| 7,626,634 B2 * | 12/2009 | Ohki et al. ................ 348/373 |
| 8,120,665 B2 | 2/2012 | Maruyama et al. |
| 2005/0213159 A1 * | 9/2005 | Okada et al. ............. 358/3.26 |
| 2006/0093237 A1 * | 5/2006 | Jacobsen et al. .......... 382/275 |
| 2007/0024712 A1 * | 2/2007 | Morita et al. ............. 348/187 |
| 2007/0070207 A1 * | 3/2007 | Sakurai .................. 348/207.99 |
| 2008/0285878 A1 * | 11/2008 | Morichika et al. ........ 382/254 |
| 2012/0056973 A1 * | 3/2012 | Yano ....................... 348/14.08 |

FOREIGN PATENT DOCUMENTS

| | | |
|---|---|---|
| EP | 1 259 059 A3 | 11/2002 |
| JP | 8-65457 | 3/1996 |
| JP | 8-168029 | 6/1996 |
| JP | 8-307750 A | 11/1996 |
| JP | 11-98485 | 4/1999 |
| JP | 2008-154055 | 7/2008 |
| JP | 2012-54814 | 3/2012 |

* cited by examiner

APPARATUS, METHOD, AND SYSTEM OF IMAGE PROCESSING, AND RECORDING MEDIUM STORING IMAGE PROCESSING CONTROL PROGRAM

CROSS-REFERENCE TO RELATED APPLICATIONS

This patent application is based on and claims priority pursuant to 35 U.S.C. §119 to Japanese Patent Application Nos. 2011-113130, filed on May 20, 2011, and 2012-064984, filed on Mar. 22, 2012, in the Japan Patent Office, the entire disclosure of which is hereby incorporated by reference.

BACKGROUND

1. Field

The present invention generally relates to an apparatus, method, and system of applying image processing to image data captured by an image capturing device, and a recording medium storing an image processing control program.

2. Background

The recent communication systems allow users, who are located at different sites, to communicate with one another through a communication network such as the Internet through communication terminals. For example, the communication terminal provided at one site obtains an image and/or voice of a user, and transmits image data and/or voice data to a counterpart communication terminal provided at the other site. Alternatively, the communication terminal at one site may obtain an image of any presentation material such as an image of a handout placed on a table, and transmit image data to the counterpart communication terminal. The counterpart terminal displays an image of the other site onto a display and/or outputs the voice of the user at the other site through a speaker. Using this communication system, videoconference can be carried out among users located at different sites.

In order to capture an image of the user or the presentation material, the communication terminal is usually provided with an image capturing device such as a video camera having an imaging element, which is capable of capturing an image of an object such as an image of the user or an image of the presentation material. To improve quality of the captured image, settings of the camera may be automatically changed based on determination whether the camera faces horizontally to capture an image of the user or faces vertically to capture an image of the presentation material. For example, Japanese Patent Application Publication No. H08-168029 discloses an image input device, which detects whether a camera faces horizontally or vertically, and causes the camera to operate in a normal resolution mode when the camera faces horizontally and in a high resolution mode when the camera faces vertically. In another example, Japanese Patent Application Publication No. 11-098485 (Registration No. 3109580) discloses an image input device, which determines a type of an object subjected for capturing based on information indicating a direction of a camera, applies correction to an image captured by the camera according to the determined type of the object to generate a corrected image, and combines a plurality of corrected images.

SUMMARY

The above-described techniques of applying image processing based on a detected direction of a camera are only applicable when the rotational center of the camera remains unchanged. In such case, as long as information regarding the horizontal and vertical directions of the camera is obtained, an imaging area that can be captured by the camera can be determined. If the rotational center of the camera changes, information regarding the height of the camera needs to be taken into account in addition to information regarding the horizontal and vertical directions to determine an imaging area or apply image processing based on the imaging area.

In view of the above, one aspect of the present invention is to provide a technique of specifying a type of an object subjected for capturing using information indicating the height of a camera, and applying image processing that is specific to the specified object type to a captured image captured by the camera. The camera may be any desirable image capturing device capable of capturing an image such as a still image or a moving image. For example, such technique may be applied to a communication terminal capable of communicating with a counterpart communication terminal such that the communication terminal automatically applies image processing specific to a specified object type to a captured image of an object to generate processed image data, and causes the processed image data to be displayed on a display at its own site or a remotely located site.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
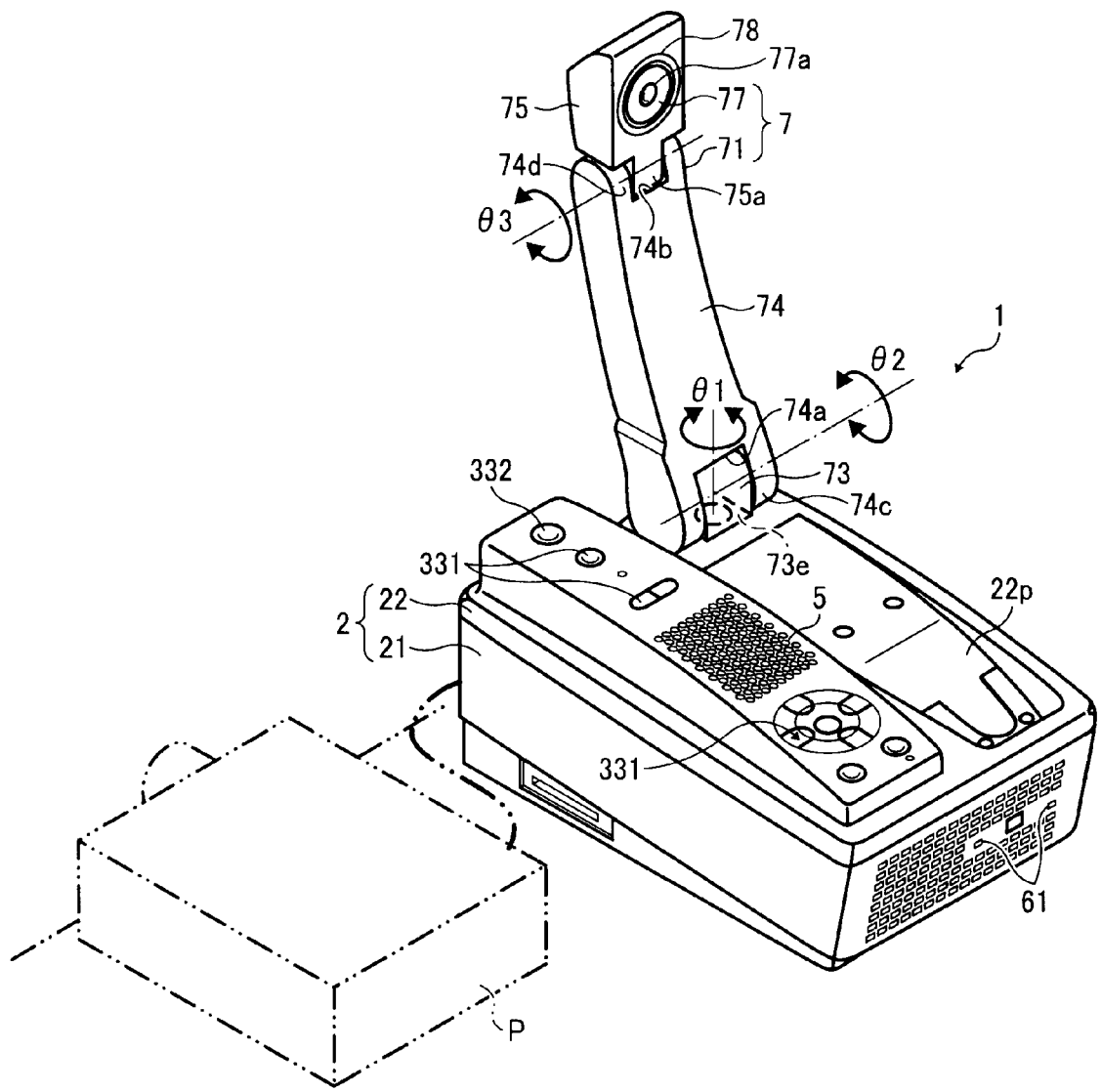
FIG. 1 is a perspective view illustrating a conference apparatus functioning as an image processing apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 2:
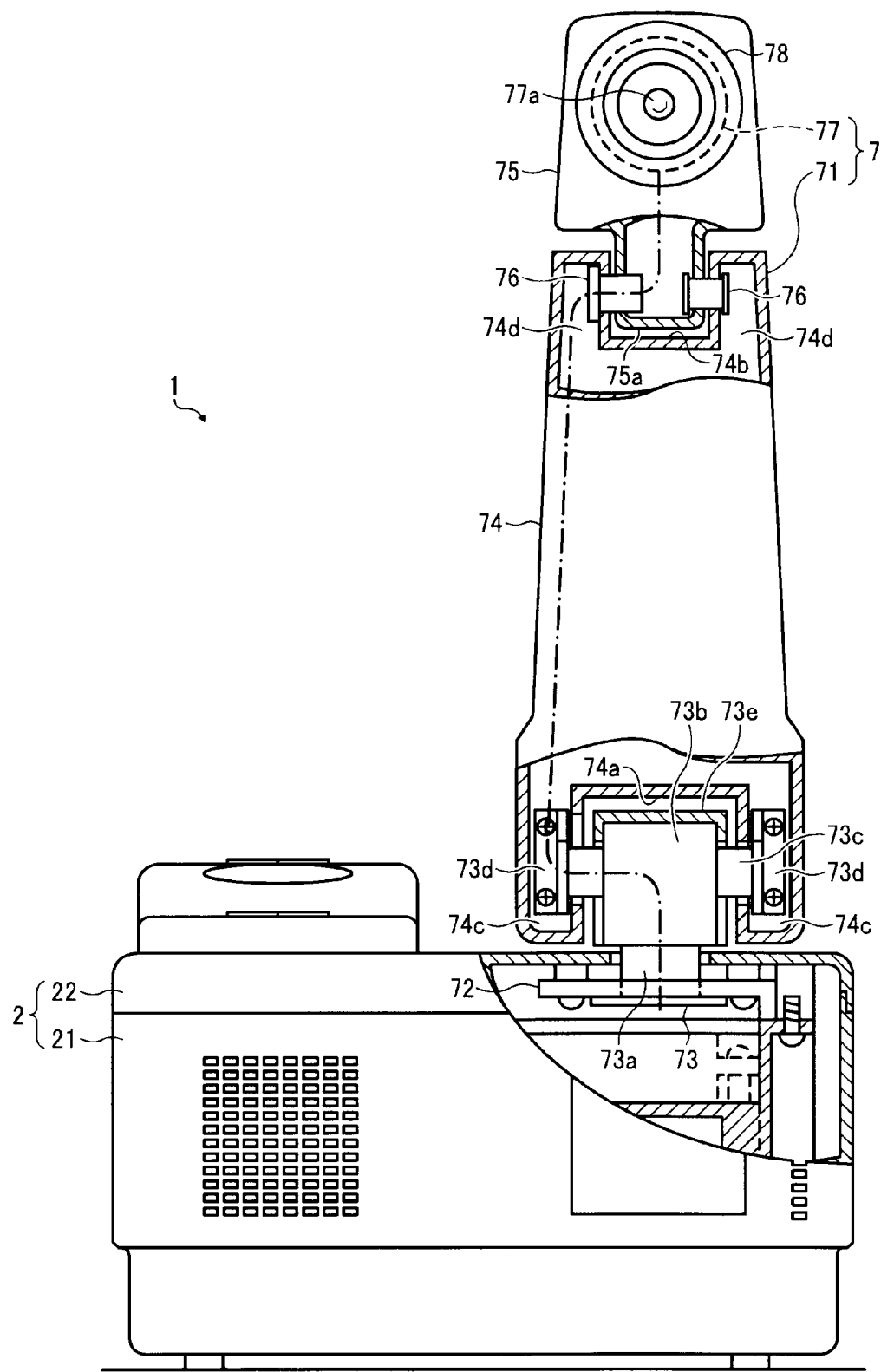
FIG. 2 is a cross sectional view illustrating an inside of a camera section of the conference apparatus of FIG. 1, viewed from a front surface of the conference apparatus.
Figure 3:
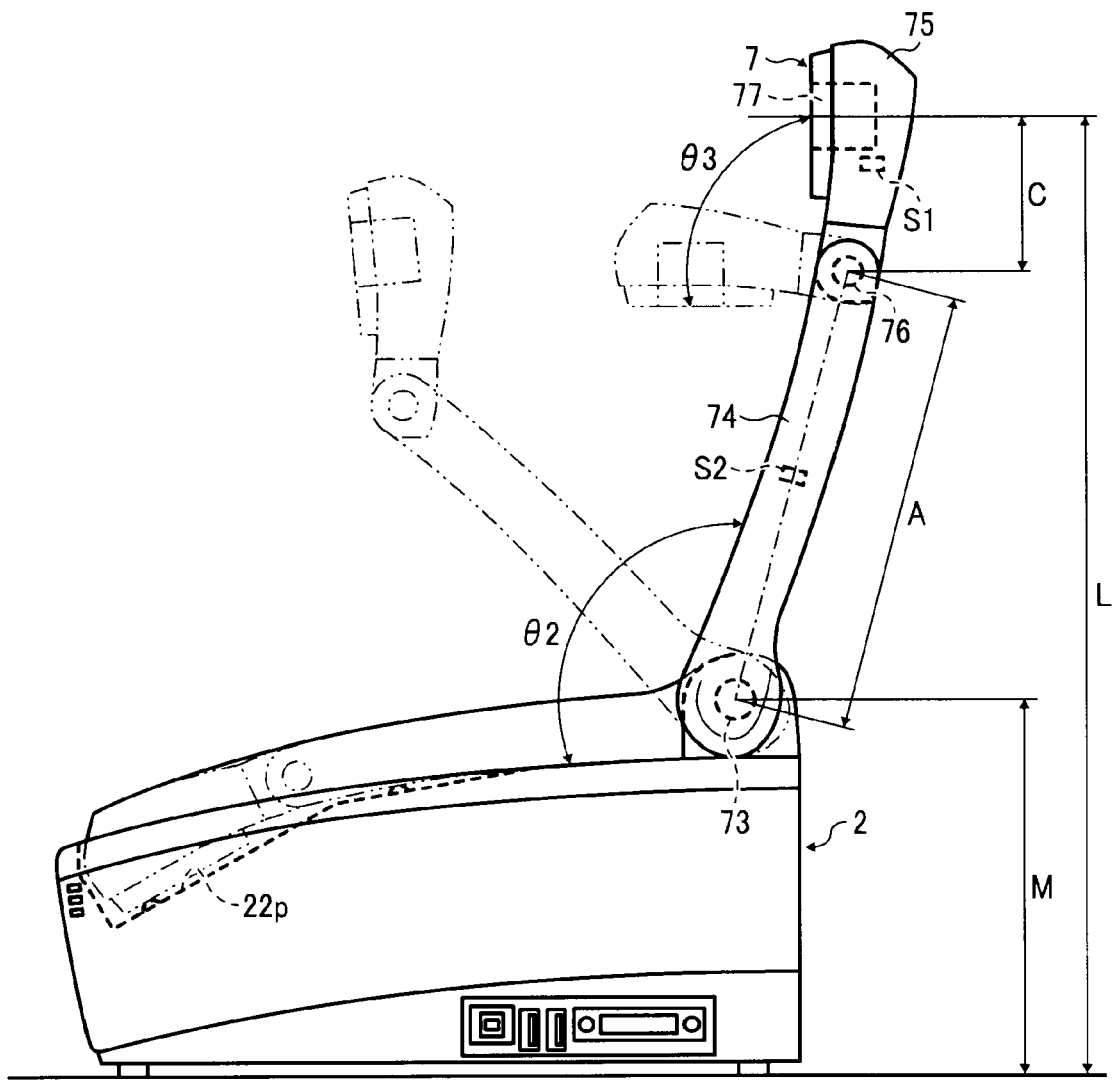
FIG. 3 is a side view illustrating the conference apparatus of FIG. 1, viewed from a right surface of the conference apparatus.
Figure 4:
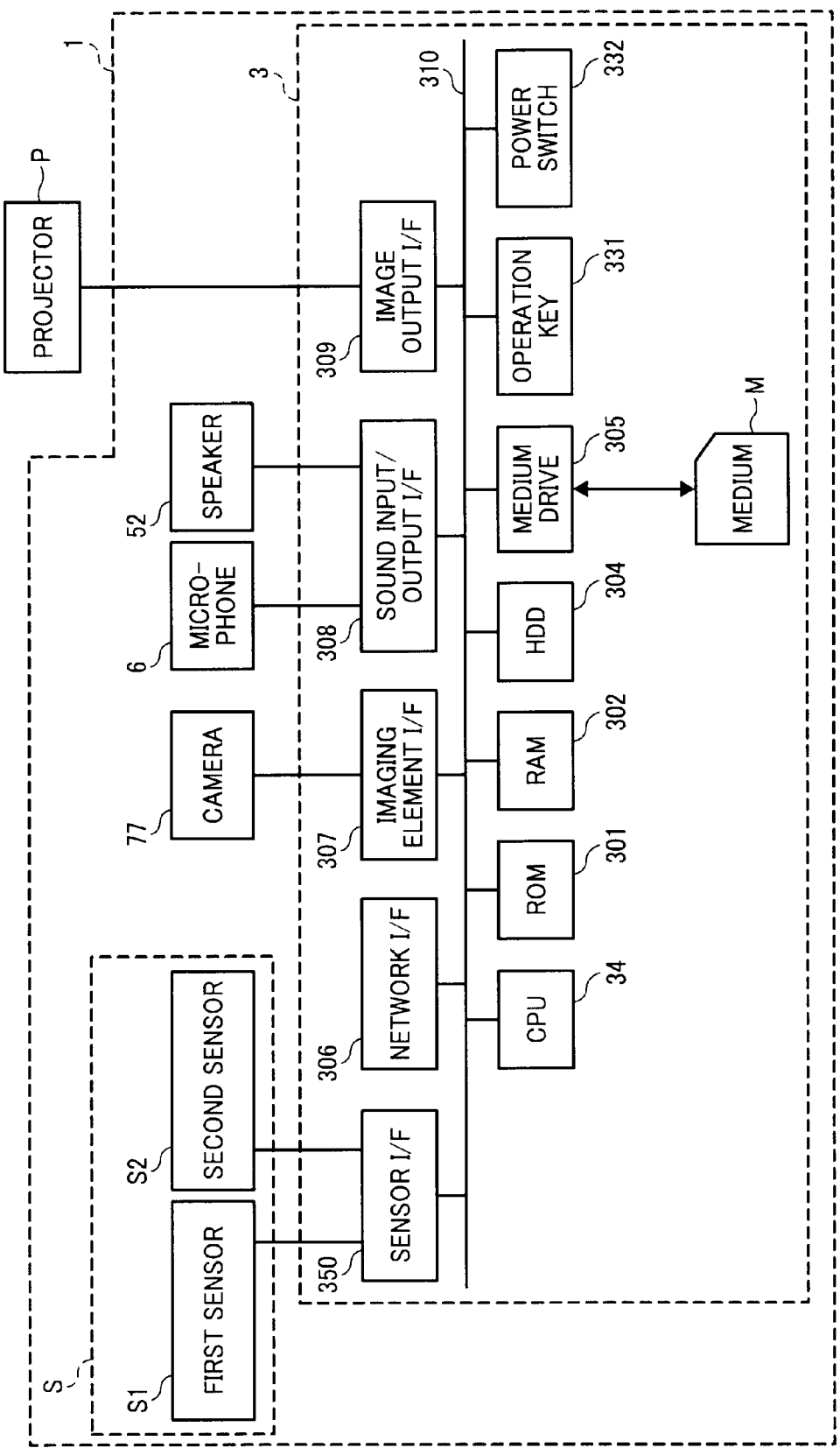
FIG. 4 is a schematic block diagram illustrating a hardware structure of the conference apparatus of FIG. 1.

Referring now to FIGS. 1 to 4, an example structure of an image processing apparatus 1 provided with an image capturing device is explained according to an example embodiment of the present invention. In the following examples, the image processing apparatus 1 is implemented by as a conference apparatus 1 provided with a camera 77 functioning as the image capturing device. As illustrated in FIGS. 1 and 4, the conference apparatus 1 includes a camera section 7 including a camera 77, an arm section 71, and a light 78, a housing 2 functioning as a support body for the camera section 7, a speaker 52, a microphone 6, an inclination detector S, and a controller circuit 3. Further, as illustrated in FIG. 4, the conference apparatus 1 is connected to a projector P.

As illustrated in FIG. 1, the housing 2 is placed on a set surface such as a conference table so as to hold the camera section 7 above the set surface. The housing 2 includes a lower housing portion 21 and an upper housing portion 22. The lower housing portion 21 is formed into a rectangular box having an opening on its top surface. The upper housing portion 21 is mounted on the top surface of the lower housing portion 21 such that it covers the opening with its bottom surface. The upper housing portion 22 is made integral with the lower housing portion 21 such as by screw or any component that fastens the upper housing portions 22 and the lower housing portions 21. On the top surface of the upper housing portion 22, a slanted concave section 22p is provided at right sides to accommodate a camera housing 75 and an arm 74 of the arm section 71 therein when the camera housing 75 and the arm section 71 are in the folded position. The left sides of the top surface of the upper housing portion 22 is formed into a dome-like shaped surface on which various operation keys 331, a power switch 332, and sound output holes 5 are provided.

Through the sound output holes 5, sounds from the speaker 52 (FIG. 4), which is installed inside the housing 2, are output. The speaker 52 is implemented by a full-range type speaker, and is connected to a sound input/output interface (I/F) 308.

The lower housing portion 21 is provided with sound input holes 61 through which a microphone 6 (FIG. 4), which is incorporated in the housing 2, collects sounds such as the human voice. The microphone 6 may be implemented by a non-directional microphone, and is connected to the sound input/output I/F 308. The microphone 6 is provided with a function of suppressing echo phenomenon, which may be caused as the microphone 6 collects the sounds output from the speaker 52 through the output holes 5.

As illustrated in FIGS. 1 and 2, the camera section 7 includes the camera 77, the arm section 71, and the light 78. The arm section 71 mainly includes a bracket 72, a hinge 73, the arm 74, and the camera housing 75. Referring to FIG. 2, the bracket 72 is implemented by a plate-like material, which has a L-shape. The longer side of the L-shaped bracket 72 is formed with a hole at its central section through which the hinge 73 is inserted, which fixes the bracket 72 to an inner frame of the housing 2.

The hinge 73 includes a fixed shaft 73a that is fixed to the bracket 72 by being inserted through the hole of the bracket 72, a first movable shaft 73b, a second movable shaft 73c, and a cap 73e. The first movable shaft 73b is exposed outside of the housing 22 through a through-hole formed on the right sides of the upper housing portion 22, and is rotatable in the circumferential direction with respect to the axis of the fixed shaft 73a. The second movable shaft 73c is provided in the direction orthogonal to the axis of the first movable shaft 73b and is rotatable in the circumferential direction with respect to the axis of the second movable shaft 73c. The second movable shaft 73c is fixed to the arm 74 at L-shaped attachment sections 73d that are provided at the both ends of the second movable shaft 73c. The cap 73e is provided so as to cover the first movable shaft 73b, while allowing at least the attachment sections 73d of the second movable shaft 73c to be uncovered.

The hinge 73 is implemented by a torque hinge such that the first movable shaft 73b and the second movable shaft 73c cause the arm 74 to stay at a specific position while keeping a specific rotational angle. Once force is applied to the hinge 73, the hinge 73 causes the arm 74 to rotate.

The arm 74 is implemented by a hollow square-shaped tube, with its cross-sectional width being gradually smaller toward the camera housing 75. The shape of the arm 74 is made so as to match with the concave section 22p such that the arm 74, when it is folded, is accommodated in the concave section 22p. The arm 74 includes a first concave part 74a having an opening that faces downward and legs 74c that form side walls of the opening at its one end, and a second concave part 74b having an opening that faces upward and legs 74d that form side walls of the opening at the other end.

The arm 74 is attached to the hinge 73 at the attachment sections 73d by screw. As illustrated in FIG. 2, the first concave section 74a is placed so as to cover the first movable shaft 73b via the cap 73e and the second movable shaft 73c in a manner such that the legs 74c of the first concave section 74a accommodate therein the attachment sections 73d, respectively. At this position, the legs 74c of the first concave section 74a are fixed to the second movable shaft 73c by screw.

With the first movable shaft 73b of the hinge 73, the arm 74 is rotatable around the axis of the first movable shaft 73b, while making a pan angle θ1 ranging up to about 180 degrees. Further, the arm 74 is rotatable around the axis of the second movable shaft 73c, while making a tilt angle θ2 ranging up to about 90 degrees. Accordingly, the arm 74 is rotatable in the upward, downward, right, and left direction, with respect to the uphold position of the camera section 7 as illustrated in FIG. 1.

Further, as illustrated in FIG. 2, a camera cable that is connected to the camera 77 runs through one of the legs 74d of the second concave section 74b, through the arm 74, and one of the legs 74c of the first concave section 74a toward the inside of the housing 2.

The camera housing 75 has a hollow-rectangular shape such that, when it is accommodated in the concave section 22p as illustrated in FIG. 3, a front surface of the camera housing 75 fits along the slanted surface of the concave section 22p, and a back surface of the camera housing 75 fits along the top surface of the housing 2. More specifically, when the conference apparatus 1 is not in use, the camera housing 75 and the arm 74 are rotated toward the top surface of the housing 2 to cause a portion of the camera housing 75 and the arm 74 to be accommodated in the concave section 22p. Further, in the folded position, the back surface of the camera housing 75 and the arm 74 is curved along the curved surface of the housing 2, thus making the top surface of the conference apparatus 1 to be smooth.

As illustrated in FIG. 2, the camera housing 75 is provided with a convex section 75a, which protrudes downward. The camera housing 75 is placed such that the convex section 75a fits in the second concave section 74b of the arm 74. At this position, the camera housing 75 is fixed to the arm 74 at a pair of support shafts 76. Each of the support shafts 76 is attached to the respective one of the legs 74d of the second concave section 74b at one end. The other end of each of the support shafts 76 is inserted to a side of the convex section 75a so as to be rotatable around the axis of the support shafts 76, while keeping the position of the camera housing 75 at a specific rotational angle when force is not applied. The camera housing 75 is rotatable around the axis of the support shafts 76, while making a tilt angle of θ3 ranging up to about 180 degrees, thus allowing the camera housing 75 to move in the upward or downward direction. As illustrated in FIG. 2, one of the support shafts 76 is implemented by a hollow shaft such that, through the opening of the support shaft 76, the camera cable connected with the camera 77 runs toward the arm 74.

The camera housing 75 is formed with a hole through which a lens 77a is exposed. The camera 77 includes a lens system including the lens 77a and a diaphragm, and an imaging element. The lens 77a is implemented by a single-focus wide angle lens having a short focal length. The components of the lens system are arranged such that the image of an object that passes the wide-angle lens 77a is focused. The imaging element converts an optimal image formed on its surface to image data, and sends the image data through the imaging element I/F 307 as a captured image or captured image data. The imaging element is implemented by a complementary metal oxide semiconductor (CMOS) or a charged couple device (CCD). The camera 77 is provided with the function of pan-focus, which offers a greater depth of field.

The camera 77 is incorporated in the camera housing 75 such that the lens 77a is exposed outside through the lens hole of the camera housing 75. The lens 77a is covered by a lens cover, which is made of acrylic material or glass material to protect the lens 77a.

Figure 5:
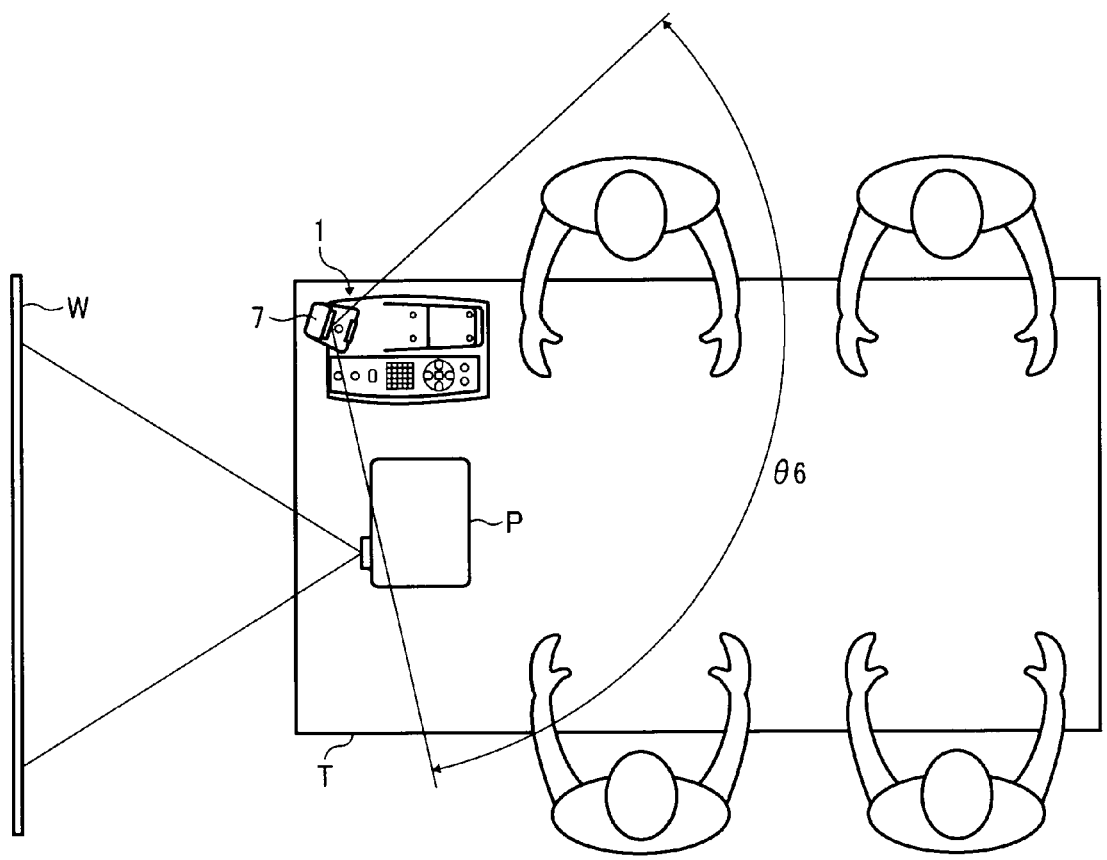
FIG. 5 is an illustration for explaining an example situation in which the conference apparatus of FIG. 1 captures an image of meeting participants using a camera provided in the camera section.

As illustrated in FIG. 5, the lens 77a of the conference apparatus 1 has a horizontal view angle θ6, which is sufficiently large enough to capture images of all participants who attend the conference under the normal settings. For example, the horizontal view angle θ6 is about 100 degrees.

Figure 10A:
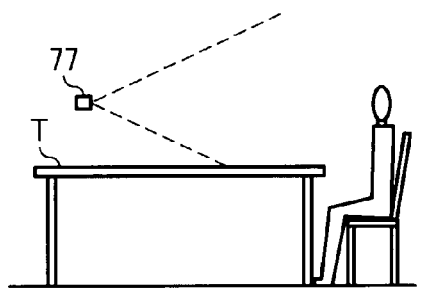
FIG. 10A is an illustration for explaining the change in inclination and height of the camera, when the conference apparatus of FIG. 1 captures an image of meeting participants.

Further, as illustrated in FIGS. 3 and 10A, the dimension of the camera section 7 such as the length of the arm 74 is previously determined such that, when the arm 74 and the camera housing 75 are both in the stand-up position, the center of the lens 77 would be positioned at an eye level of a human. More specifically, the length of the camera section 7 such as the length of the arm 74 is determined such that the distance between the center lens and the surface of a conference table where the conference apparatus 1 is placed in the vertical direction will be substantially the same as the level of eyes of an adult having an average height and who is sitting at the conference table. The conference table is assumed to be a standard size table that is typically used for offices. Further, a chair is assumed to be a standard size chair that is typically used for offices.

The light 78 is implemented by a light emitting element such as a light emitting diode (LED). As illustrated in FIG. 3, a plurality of LEDs are arranged in the circumferential direction of the lens 77a to form a ring shape. When the conference apparatus 1 determines that an object is a presentation material such as a recording sheet or a product placed on the conference table, the light 78 is automatically turned on at least at the time of capturing the object. More specifically, as described below referring to FIG. 12, when the conference apparatus 1 determines that the camera 77 faces downward, the light 78 is turned on. When the conference apparatus 1 determines that the camera 77 faces upward or in the horizontal direction, the light 77 is turned off. Alternatively, the light 78 may be turned on according to a user instruction input through at least one of the operation keys 331. With the light being turned on, a shadow that may be caused by a portion of the camera section 7 is removed.

With the above-described structure, the height and the orientation of the camera 77 is adjusted depending on a type of an object to be captured.

For example, as illustrated in FIG. 10A, the conference apparatus 1 may take an image of one or more meeting participants who are sitting at the conference table. In such case, the user is most likely to put the camera housing 75 and the arm 74 to be in the stand-up positions such that the center of the lens 77 is in the eye level position.

Figure 6:
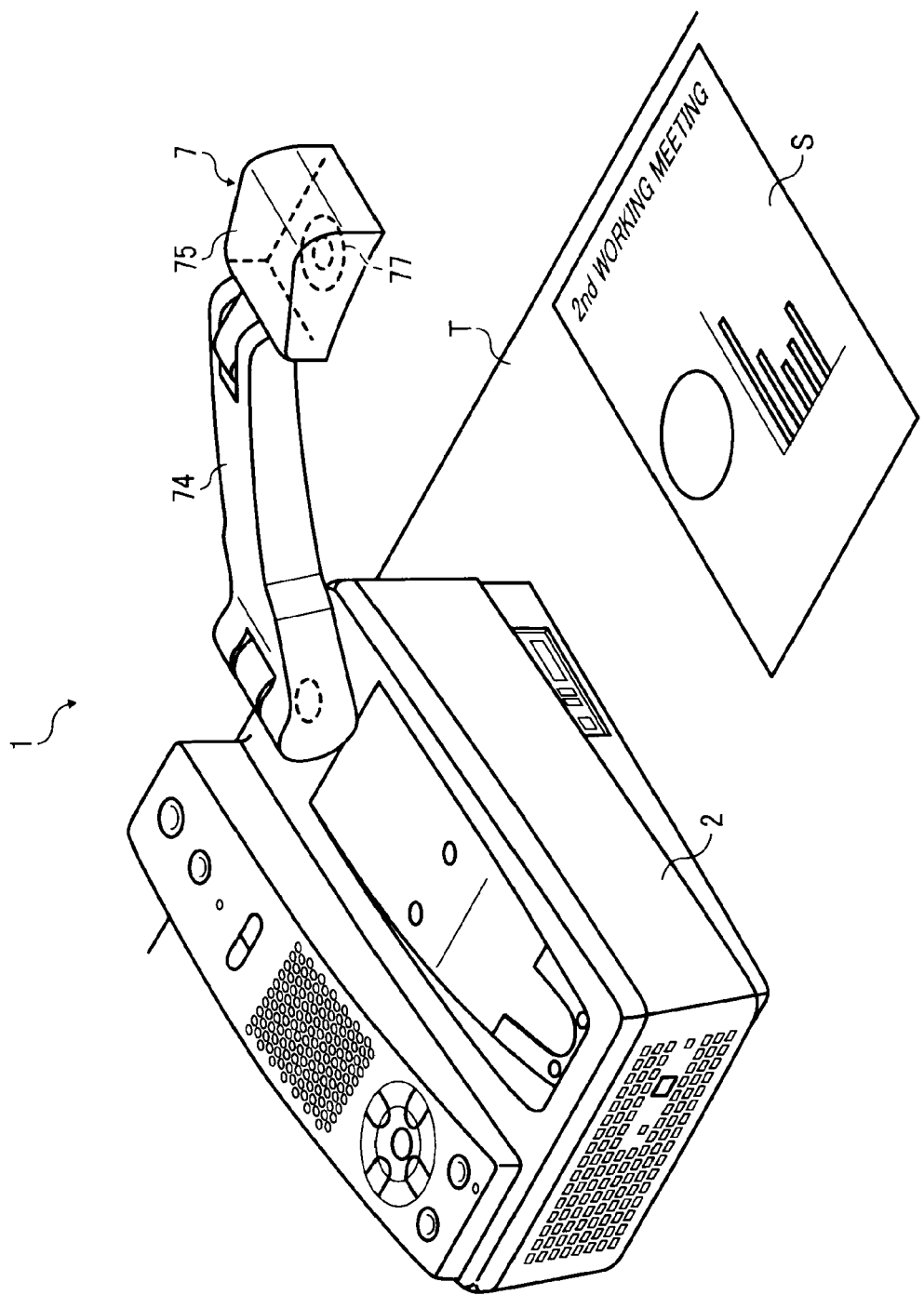
FIG. 6 is an illustration for explaining an example situation in which the conference apparatus of FIG. 1 captures an image of a presentation material placed on a conference table, using the camera provided in the camera section.
Figure 10B:
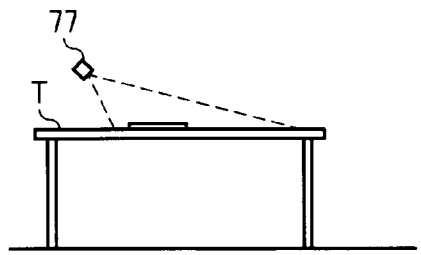
FIG. 10B is an illustration for explaining the change in inclination and height of the camera, when the conference apparatus of FIG. 1 captures an image of a presentation material placed on a conference table.

In another example, as illustrated in FIGS. 6 and 10B, the conference apparatus 1 may take an image of a presentation material that is placed on the conference table, such as a recording sheet S or a sample product. In such case, the user is most likely to turn the arm 74 toward the presentation material and causes the camera housing 75 to face downward. Since the camera section 7 is fixed on the right sides of the housing 22, the arm 74 is able to extend far from the housing 2 such that the camera 77 can easily capture the presentation material placed on the side of the conference apparatus 1. In alternative to providing the camera section 7 at the right sides, the camera section 7 may be provided on the left sides of the conference apparatus 1.

Figure 10C:
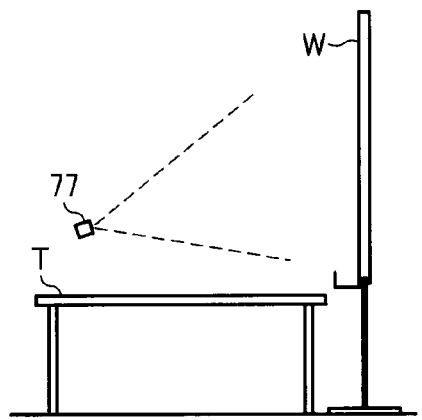
FIG. 10C is an illustration for explaining the change in inclination and height of the camera, when the conference apparatus of FIG. 1 captures an image projected on a whiteboard by a projector.

In another example, as illustrated in FIG. 10C, the conference apparatus 1 may take an image of a projection image that is projected by the projector P on a whiteboard W. It is assumed that the whiteboard W is placed at a position away from the position where the participants sit via the conference table. In such case, the user is most likely to turn the arm 74 in the direction that faces the backside of the conference apparatus 1 and causes the camera housing 75 to face upward. Alternatively, the user may change the orientation of the conference apparatus 1 so that the front surface of the housing 2 faces toward the whiteboard W, and causes the camera housing 75 to face upward.

The controller circuit 3 specifies a type of an object being captured or to be captured by the camera 77 based on information indicating the height L of the camera section 7 and the inclination information regarding the camera 77 and the arm 74, and applies image processing specific to the specified object type to a captured image.

As illustrated in FIGS. 3 and 4, the inclination detector S includes a first sensor S1 and a second sensor S2.

The first sensor S1 is implemented by a biaxial accelerometer, and is connected to the sensor I/F 350. As illustrated in FIG. 3, the first sensor S1 is provided inside the camera housing 75. The first sensor S1 detects the inclination of the camera 77, and outputs a detection result as information indicating the inclination of the camera 77. As described below referring to FIGS. 7 and 8, the inclination of the camera 77 is obtained as an inclination defined by a horizontal vector H1 representing an axial direction that passes through the lens center when the lens 77a points out in the horizontal direction, and a vertical vector V1 that is orthogonal to the horizontal vector H1.

In this example, since the camera housing 75 rotates in the upward or downward direction around the axis of the pair of support shafts 76, the biaxial accelerometer is used. In case the camera housing 75 rotates in a plurality of directions such that a three-dimensional positioning is necessary, a three-dimensional or three-axis accelerometer may be implemented to detect the inclination of the camera 77.

Figure 7:
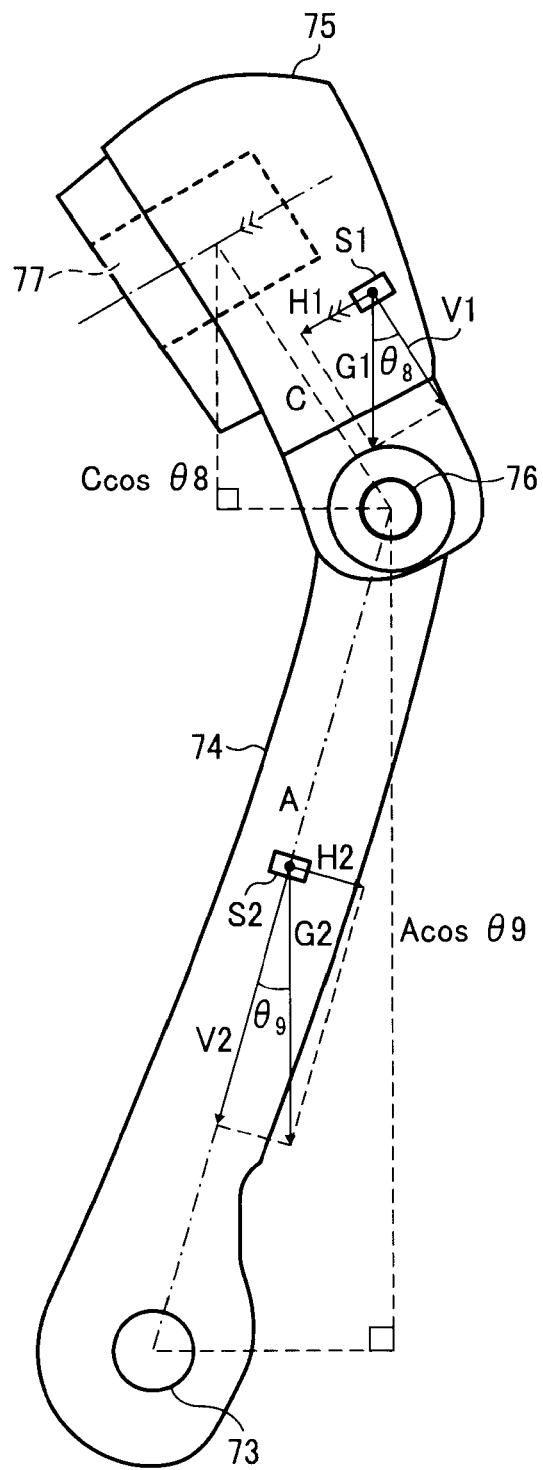
FIG. 7 is an illustration of a portion of the camera section of the conference apparatus of FIG. 1, when the camera faces downward.
Figure 8:
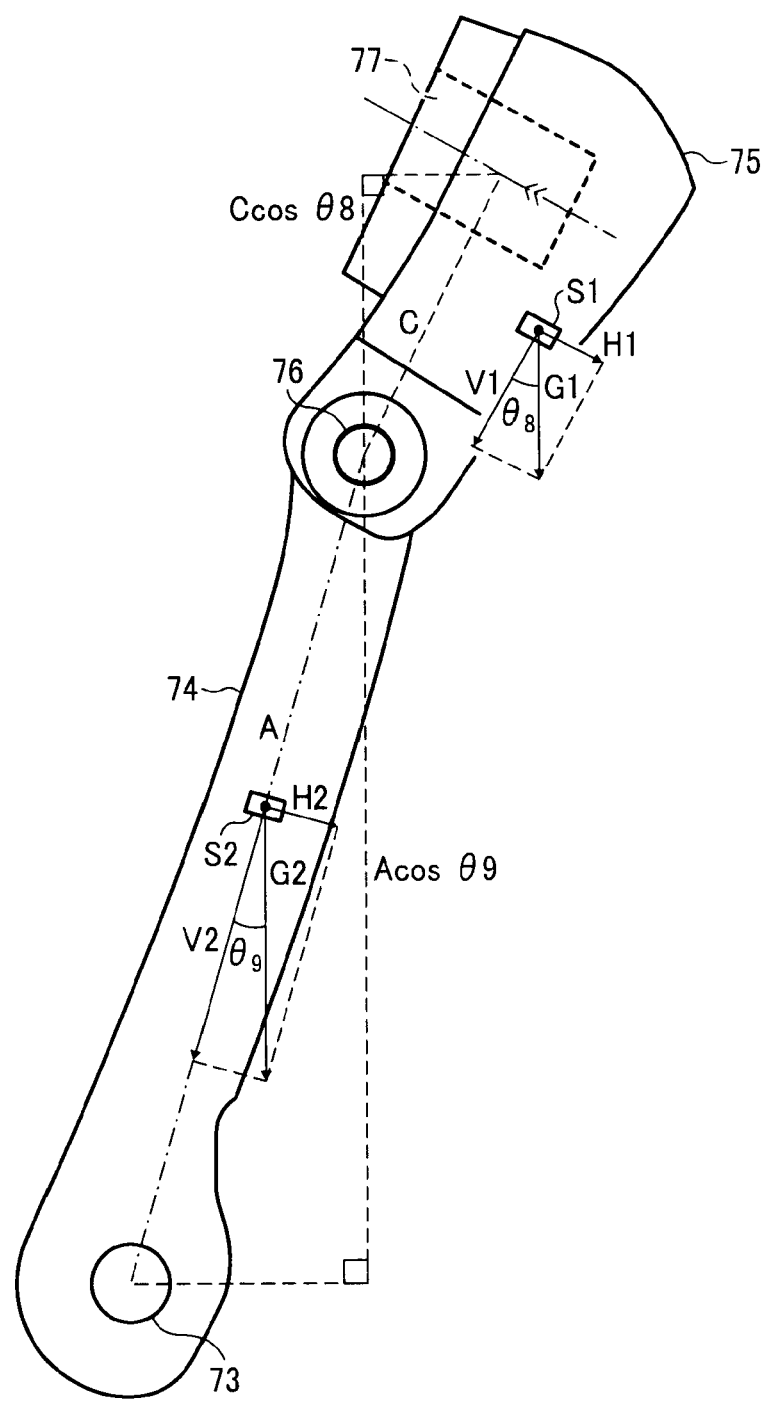
FIG. 8 is an illustration of a portion of the camera section of the conference apparatus of FIG. 1, when the camera faces upward.

The second sensor S2 is implemented by a biaxial accelerometer, and is connected to the sensor I/F 350. As illustrated in FIG. 3, the second sensor S2 is provided inside the arm 74. The second sensor S2 detects the inclination of the arm 74, and outputs a detection result as information indicating the inclination of the arm 74. As illustrated in FIGS. 7 and 8, the inclination of the arm 74 is obtained as an inclination defined by a horizontal vector H2 representing a horizontal direction, or front-back direction, of the arm 74 when the arm 74 is placed on the horizontal surface, and a vertical vector V2 that is orthogonal to the horizontal vector V1 and represents an axial direction of a line that intersects the center of the support shafts 76 and the center of the hinge 73.

In this example, since the arm 74 rotates in the upward, downward, right or left direction around the axis of the first movable shaft 73b and the second movable shaft 73c of the hinge 73, the biaxial accelerometer is used. In case the arm 74 rotates in a plurality of directions such that a three-dimensional positioning is necessary, a three-dimensional or three-axis accelerometer may be implemented to detect the inclination of the arm 74. In addition or in alternative to the accelerometer, a gyroscope sensor may be used.

The controller circuit 3 encodes sound data and/or image data to be transmitted to a counterpart apparatus through a network, or decodes sound data and/or image data that is received from the counterpart apparatus through the network. More specifically, the controller circuit 3 specifies a type of an object being captured or to be captured by the camera 77 and applies image processing that is applicable to the specified type of object, to a captured image captured by the camera 77. The controller circuit 3 encodes the captured image, which is the image data to be transmitted, and transmits the encoded image data to the counterpart apparatus through the network. Alternatively or additionally, the controller circuit 3 may cause the projector P to display the captured image onto the whiteboard W.

As illustrated in FIG. 4, the controller circuit 3 includes a central processing unit (CPU) 34, a read only memory (ROM) 301, a random access memory (RAM) 302, a hard disk drive (HDD) 304, a medium drive 305, the operation keys 331, the power switch 332, a network interface (I/F) 306, the imaging element I/F 307, the sound input/output I/F 308, an image output I/F 309, and the sensor I/F 350, which are connected through a bus line 310 such as an address bus or a data bus. In this example, the image data to be captured and transmitted may be a moving image or a still image.

The CPU 34 controls entire operation of the conference apparatus 1 according to a control program specially designed for the conference apparatus 1. The control program allows the conference apparatus 1 to communicate image data or sound data through the network such as the Internet to carry out communication such as videoconference with the counterpart apparatus. The control program includes an image processing control program that causes the CPU 34 to perform various image processing on captured image data. For example, the image processing control program causes the CPU 34 to specify a type of an object being or to be captured by the camera 77 based on information regarding an inclination that is output by the inclination detector S and information regarding the dimension of the conference apparatus 1, and applies image processing that is desirable for the specified type of object to a captured image.

The ROM 301 stores therein various programs to be used for driving the CPU 34 including, for example, an initial program loader (IPL). The RAM 302 functions as a work area of the CPU 34.

The HDD 304 stores therein the control program for the conference apparatus 1 including the image processing control program, various image data and/or sound data, and information regarding the dimension of the conference apparatus 1. Since the information regarding the dimension of the conference apparatus 1 is a fixed value, such value may be integrated into the image processing control program in the form of formula or a set of instructions to be performed according to the image processing control program. In alternative to the HDD 304, any desired memory or device may be used such as a solid state drive (SSD) that reads or writes various data with respect to a flash memory under control of the CPU 34.

The medium drive 305 controls reading or writing of various data with respect to a removable recording medium M such as a flash memory. The recording medium M, which can be freely attached or detached from the conference apparatus 1, includes any desired type of recording medium. In alternative to the flash memory, any nonvolatile memory that is readable or writable under control of the CPU 34 may be used such as Electrically Erasable and Programmable ROM (EEPROM).

The control program for the conference apparatus 1 may be written on to a recording medium that is readable by a general-purpose computer such as the recording medium M in any format that is installable or executable by a general-purpose computer. Once the control program is written onto the recording medium M, the recording medium M may be distributed. Further, the control program may be stored in any desired memory other than the HDD 304, such as the ROM 301.

The operation keys 331 include various buttons or switches that allow the user to input a user instruction for displaying a menu, selecting a menu, selecting a communication destination such as a counterpart apparatus, instructing communication to end, adjusting a sound volume, selecting a microphone mute function, etc. The power switch 332 allows the user to switch on or off the power of the conference apparatus 1.

The network I/F 306 allows the conference apparatus 1 to transmit data through the network such as the Internet, and is provided with one or more connection ports in compliance with the Ethernet. Through the connection port, the network I/F 306 is connected to the Internet via a cable. Alternatively, the conference apparatus 1 may be connected to the network via a wireless network.

The imaging element I/F 307, which is connected to the camera 77, receives an image signal that is output by the camera 77 as a captured image or captured image data.

The sound I/O I/F 308 receives a sound signal output by the microphone 6 as sound data for transmission to the counterpart apparatus. The sound I/O I/F 308 further receives sound data that is transmitted from the counterpart apparatus through the network I/F 306, and outputs a sound signal based on the received sound data through the speaker 5.

The image output I/F 309 is provided with at least one connection port, which is connected to the projector P via a cable. Alternatively, the image output I/F 309 may be connected to the projector P via a wireless network. The image output I/F 309 converts various data to be output to the projector P, to an analog or digital image signal having a predetermined format. Examples of data include, but not limited to, data indicating a counterpart conference apparatus, data adjusting an image quality, data indicating a menu screen such as an operation icon that selects an output signal, encoded image data received from the network, and captured image data captured by the camera 77. In case the encoded image data is received through the network from the counterpart conference apparatus, the CPU 34 decodes the encoded image data using a predetermined codec. The predetermined format of the image signal to be output to the projector P may be an analog RGB (VGA) signal, a component video signal, a high-definition multimedia interface (HDMI) signal, or a digital video interactive (DVI) signal.

The sensor I/F 350 is input with analog signals that are respectively output from the first sensor S1 and the second sensor S2. The sensor I/F 350 converts the analog signals to digital signals.

Before starting videoconference, the user at the conference apparatus 1 makes the camera housing 75 and the arm 74 to be in the stand-up position as illustrated in FIG. 1, and turns on the power by pressing the power switch 332. As the power is turned on, the conference apparatus 1 allows the user to set various settings using the operation keys 331, and further allows the user to select a counterpart conference apparatus. For example, the conference apparatus 1 may cause the projector P to display a menu screen on the whiteboard W. When the counterpart conference apparatus is selected, the conference apparatus 1 starts videoconference with the counterpart apparatus 1. More specifically, the camera 77 starts capturing an image of an object to be transmitted to the counterpart apparatus.

The conference apparatus 1 specifies a type of the object based on information indicating the height of the camera 77 and information indicating the incline of the arm 71 and the camera 77, and applies image processing that is desirable to the specified object type to the captured image.

(1) Conference Scene

In one example, the CPU 34 of the conference apparatus 1 may specify that the object type corresponds to a conference scene including an image of participants attending the conference or an image of a room where the conference is taking place.

Figure 11A:
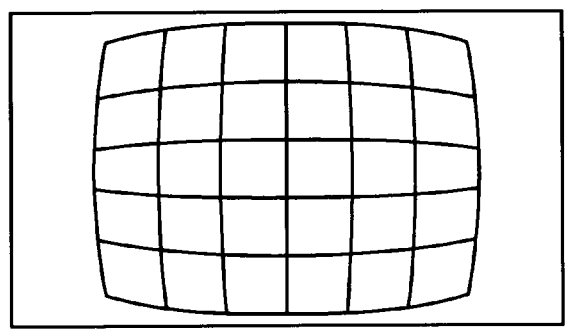
FIG. 11A is an example image with barrel distortion.
Figure 11B:
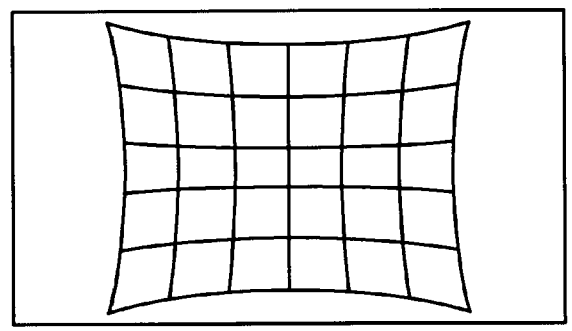
FIG. 11B is an example image with pincushion distortion.

Using the wide angle lens 77a, the camera 77 is able to capture an image of almost all participants as illustrated in FIG. 5. The image captured with the wide angle lens 77a, however, tends to suffer from lens distortion. There are mainly two types of lens distortion: barrel distortion as illustrated in FIG. 11A; and pincushion distortion as illustrated in FIG. 11B. When the wide-angle lens is used, the captured image tends to suffer from barrel distortion. In some cases, the captured image may have pincushion on one section and barreling on the other section.

While it is possible to remove the influences due to lens distortion through digital processing, completely eliminating such influences without taking the other factors may further cause the captured image to be overcompensated, thus creating an unnatural image.

Figure 11C:
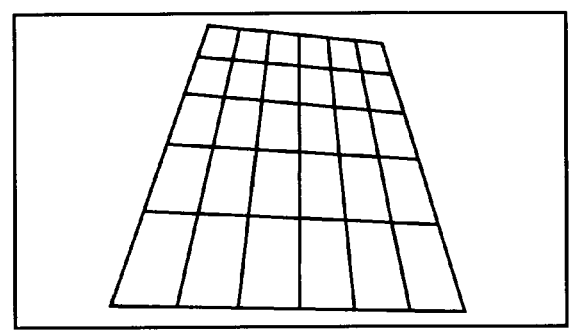
FIG. 11C is an example image with perspective distortion.

Further, when a distance between the camera 77 and each of the objects is not constant, the captured image tends to suffer from perspective distortion as illustrated in FIG. 11C. More specifically, nearby objects tends to be larger than far-away objects of the same size, producing the converging vertical lines. Further, the captured image may suffer from geometric distortion, which causes an object near the corners of the image to be deformed.

In case the object type is specified to be a conference scene, the controller circuit 3 applies image processing that is specially designed for the conference scene object type to output a captured image that looks more natural. More specifically, the image processing designed for the conference scene object type includes processing that corrects lens distortion with a predetermined correction parameter, and processing that corrects perspective distortion with a predetermined correction parameter.

The CPU 32 further controls exposure of the camera 77 such that the object is rendered in a neutral gray tone when the object type is specified to be the conference scene. For example, the CPU 32 further applies color tone correction such as brightness correction, contrast correction, or level correction such as gamma correction, which is applicable to the neutral gray image.

(2) Entire Section of Whiteboard or Entire Section of Presentation Material

In another example, the CPU 34 of the conference apparatus 1 may specify that the object type corresponds to an entire section of the whiteboard W or an entire section of a presentation material such as a printed sheet placed on a wall, or an entire section of a presentation material such as a printed sheet placed on a table. In such case, the captured image tends to suffer from perspective distortion as illustrated in FIG. 11C, in addition to lens distortion. Especially since the object is the whiteboard or the recording sheet having a rectangular shape, having a non-rectangular shape in the captured image looks unnatural such that it is perceived as distorted.

Figure 11D:
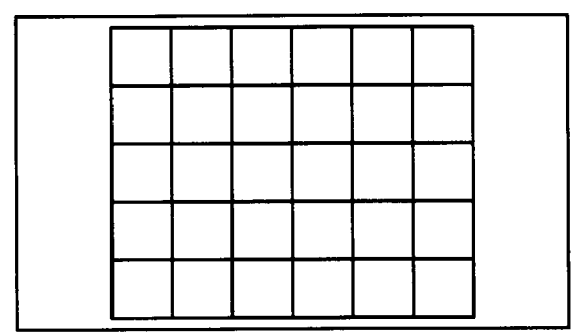
FIG. 11D is an example image with no distortion or distortion corrected.

In such case, the CPU 34 applies image processing that corrects perspective distortion to the captured image to output a corrected captured image as illustrated in FIG. 11D. More specifically, the controller circuit 3 extracts a quadrilateral from an imaging area, and corrects the quadrilateral, which looks deformed, into a rectangular shape such that the corrected image looks more natural. The CPU 34 further applies image processing that corrects lens distortion to the captured image, for example, before applying the image processing that corrects perspective distortion.

Since the deformed rectangular shape tends to be more noticeable than the deformed human face, the degree of compensation for perspective distortion correction for the entire whiteboard or presentation material object type is set to be larger than that of the conference scene object type. By applying image processing that corrects distortion with a larger correction value, characters or figures in the captured image can be easily recognized.

Further, even when the object type is the entire whiteboard or presentation material, the degree of distortion differs depending on a perspective of the camera 77. More specifically, when the camera 77 takes an image of the object while facing up, such as in case of taking an image of the whiteboard W, the captured image tends to be largely influenced by perspective distortion as the camera 77 is distanced away from the whiteboard W. When the camera 77 takes an image of the object while facing down, such as in case of taking an image of the presentation material placed on the conference table, the captured image is not likely to be influenced so much by perspective distortion. For this reasons, the degree of compensation for perspective distortion correction for the whiteboard (when the camera 77 faces upward) is set to be larger than that of the presentation material (when the camera 77 faces down).

More specifically, in this example, the degree of compensation for perspective distortion correction may be determined based on the quadrilateral that is extracted from the imaging area, thus improving accuracy in correction. For example, the CPU 34 assumes that the extracted quadrilateral is a deformed imaging area, and applies image processing to make the extracted quadrilateral into a rectangular shape.

The CPU 34 further applies color tone correction so as to suppress the captured image from being too light or too dark, or to improve the contrast in the captured image.

(3) Portion of Whiteboard or Portion of Presentation Material

In another example, the CPU 34 of the conference apparatus 1 may specify that the object type corresponds to a portion of the whiteboard W or a portion of a presentation material such as a printed sheet placed on a wall, or a portion of a presentation material such as a printed sheet placed on a table. In such case, the captured image tends to suffer from perspective distortion as described above referring to the case where the object type is the entire section of the whiteboard or presentation material. The CPU 34 applies image processing in a substantially similar manner as described above referring to the case where the object type is the entire section of the whiteboard or presentation material. Since the quadrilateral cannot be extracted, the CPU 34 calculates an imaging area using information regarding the height L and the inclination of the camera section 7, as described below. Based on the calculated imaging area, the CPU 34 applies image processing that corrects perspective distortion to the captured image such that the corrected captured image looks more natural.

In this manner, the CPU 34 determines various correction parameters including a correction parameter for correcting lens distortion, a correction parameter for correcting perspective distortion, and a correction parameter for correcting color tones, based on a type of an object that is specified using information regarding the height L and the inclination of the camera section 7.

Figure 12:
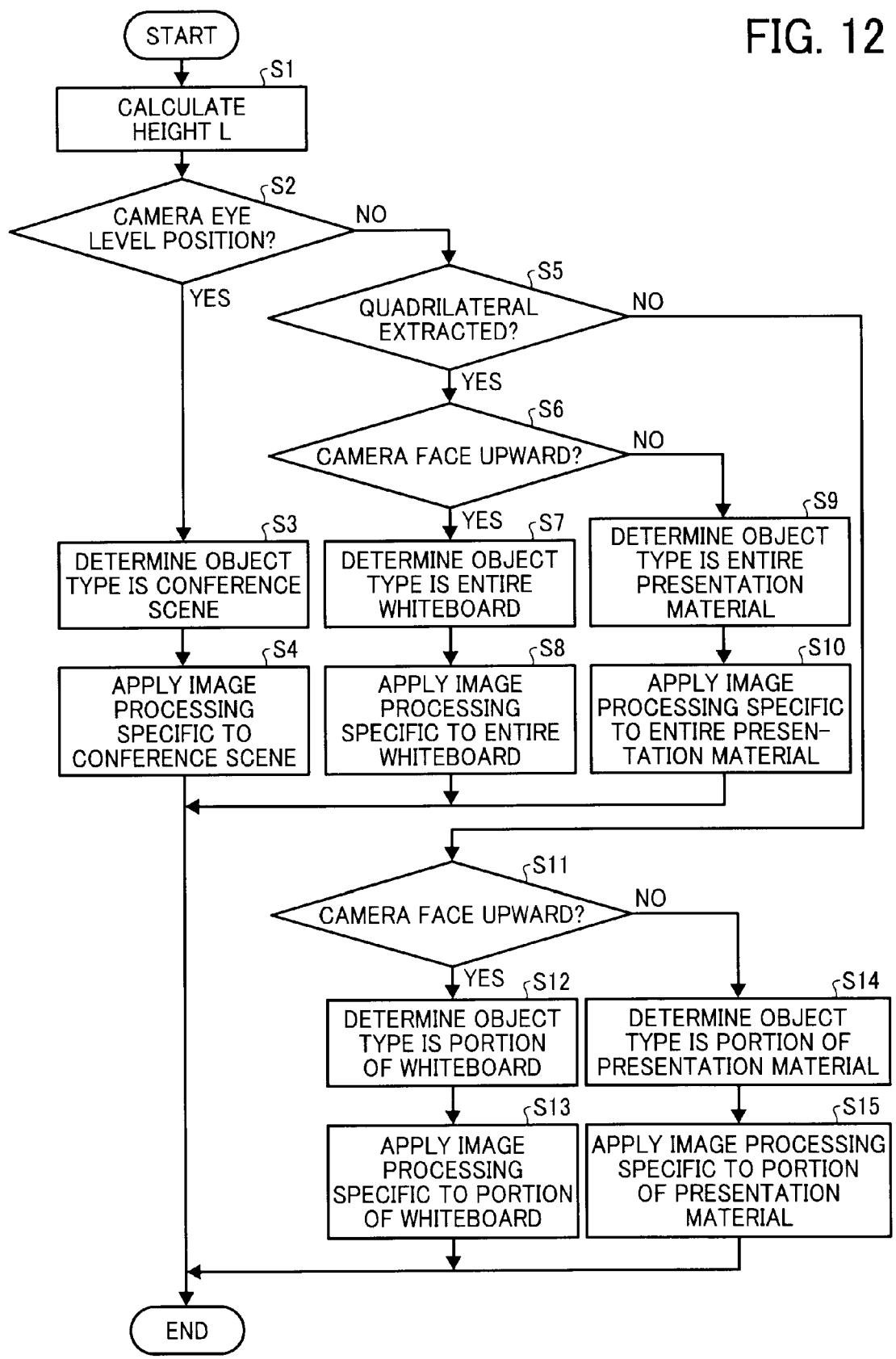
FIG. 12 is a flowchart illustrating operation of specifying a type of an object being captured by the conference apparatus of FIG. 1, and applying image processing specific to the specified object type to a captured image, according to an example embodiment of the present invention.

Referring now to FIG. 12, operation of specifying an object type, and applying image processing specific to the specified object type to captured image data, performed by the CPU 34, is explained according to an example embodiment of the present invention. As described above, operation of FIG. 12 is performed by the CPU 34 according to the image processing control program.

At S1, the CPU 34 obtains height information indicating the height L of the camera 77 that is a distance between a set surface where the conference apparatus 1 is set and the center of the camera 77, based on data output from the first sensor S1 and the second sensor S2.

As illustrated in FIG. 3, the height L of the camera 77 is obtained from a housing length M between the center of the hinge 73 and the set surface, an arm length A that is a distance between the center of the hinge 73 and a center of the support shafts 76, and a camera length C that is a distance between the center of the support shafts 76 and the center of the lens 77a. The housing length M, the arm length A, and the camera length C, which are collectively referred to as information regarding the dimension of the conference apparatus 1, may be previously stored in the HDD 304 or embedded in terms of a set of instructions of the image processing control program.

In the following examples, since the conference apparatus 1 is usually placed onto a horizontal surface such as a conference table, a height of the housing 2 is fixed to the housing length M between the center of the hinge 73 and the set surface. In case the conference apparatus 1 is placed onto a non-horizontal surface, a sensor such as a three-dimensional accelerometer may be additionally provided to detect the inclination of the housing 2 to obtain the accurate value of the height of the housing 2.

Since the output values of the first sensor S1 and the second sensor S2 vary, respectively, depending on the inclination of the camera 77 and the arm 74, through the output values of the sensors S1 and S2, the inclination of the camera 77 and the inclination of the arm 74 are respectively obtained.

The height L of the camera 77 between the set surface and the camera center is obtained based on the dimensional information of the conference apparatus 1, and the output values of the first sensor S1 and the second sensor S2, as follows.

Referring to FIGS. 7 and 8, the height of the arm 74, which is obtained as the length of a vertical line that intersects the arm length A at the center of the support shafts 76, is calculated using the output value of the second sensor S2. More specifically, the second sensor S2 outputs the values of horizontal vector H2 and vertical vector V2, which are components of gravitational acceleration G2. The degree of inclination $\theta 9$ is obtained as follows.

$$\theta 9 = \tan^{-1} H2/V2 \qquad \text{(Equation 1)}$$

The height of the arm 74, or the vertical length of the arm length A, is defined to be $A \cos \theta 9$ from the equation 1.

The height of the camera 77 measured from the support shafts 76, which is obtained as the length of a vertical line that intersects the camera length C at the lens center (or the camera center), is calculated using the output value of the first sensor S1. More specifically, the first sensor S1 outputs the values of horizontal vector H1 and vertical vector V1, which are components of gravitational acceleration G1. The degree of inclination $\theta 8$ obtained as follows.

$$\theta 8 = \tan^{-1} H1/V1 \qquad \text{(Equation 2)}$$

The height of the camera 77, or the vertical length of the camera length C, that is measured from the center of the support shafts 76 is defined to be $C \cos \theta 8$ from the equation 2.

Accordingly, the height L of the camera 77 measured from the set surface is defined by the equation 3 as follows.

$$L = M + A \cos \theta 9 + C \cos \theta 8 \qquad \text{(Equation 3)}$$

The CPU 34 specifies a type of an object that is subjected for capturing, using information regarding the height L of the camera 77 measured from the set surface, the inclination angle $\theta 9$ of the arm 74, and the inclination angle $\theta 8$ of the camera 77.

As described above, the height L, which is a distance between the lens center and the set surface, is previously determined such that the height L corresponds to an eye level of an adult having an average height who sits at a conference table, when the camera housing 75 and the arm 74 of the camera section 7 are in the stand-up positions. Based on this assumption, the CPU 34 determines that a type of the object corresponds to a conference scene based on whether the camera section 7 is in the eye level position. Since the housing length M between the set surface and the center of the hinge 73 is fixed, the CPU 34 determines that the camera 77 is in the eye level position, when the inclination angle θ9 of the arm 74 and the inclination angle θ8 of the camera 77 are within a predetermined range, respectively, and the height L of the camera measured from the set surface is within a predetermined range (Equation 3).

When the position of the camera 77 is in the eye level position ("YES" at S2), at S3, the CPU 34 determines that the object type is the conference scene, and the operation proceeds to S4 to apply image processing specific to the conference scene object type to a captured image, and the operation ends.

More specifically, as described above in the case where the object type is the conference scene, the CPU 34 applies image processing that corrects lens distortion with a predetermined correction parameter, and image processing that corrects perspective distortion with a predetermined correction parameter, so as to output the captured image that looks more natural. The CPU 34 further applies color tone correction.

When the position of the camera 77 is not in the eye level position ("NO" at S2), the CPU 34 determines that the object type is other than the conference scene, and the operation proceeds to S5.

At S5, the CPU 34 determines whether any quadrilateral is extracted from an imaging area to be captured, using any desired boundary extraction technique. For example, the CPU 34 extracts a quadrilateral using the technique described in U.S. patent application Registration No. 8,120,665, the entire contents of which are hereby incorporated by reference.

When it is determined that a quadrilateral is extracted ("YES" at S5), the operation proceeds to S6 to determine whether the camera 77 faces upward using the information regarding the inclination angle θ9 of the arm 74, and/or the inclination angle θ8 of the camera 77. For example, the CPU 34 may determine whether the camera 77 faces upward or downward using the value of horizontal vector H1 that is output from the first senor S1.

When the camera 77 faces in the horizontal direction, the value of horizontal vector H1 that is output from the first sensor S1 is "0". As illustrated in FIG. 7, when the camera 77, or the camera housing 75, is rotated in the counterclockwise direction facing downward, the first sensor S1 outputs a negative value of horizontal vector H1, which indicates the degree of inclination of the camera 77. As illustrated in FIG. 8, when the camera 77, or the camera housing 75, is rotated in the clockwise direction facing upward, the first sensor S1 outputs a positive value of horizontal vector H1, which indicates the degree of inclination of the camera 77.

When the value of horizontal vector H1 is negative, the CPU 34 determines that the camera 77 faces downward. When the value of horizontal vector H1 is positive, the CPU 34 determines that the camera 77 faces upward. When the value of horizontal vector H1 is "0", the CPU 34 determines that the camera 77 faces in the horizontal direction such that the camera 77 is in the stand-up position.

When it is determined that the camera 77 faces upward ("YES" at S6), at S7, the CPU 34 determines that the type of the object is an image of an entire section of the whiteboard. At S8, the CPU 34 applies image processing specific to the entire section of the whiteboard to a captured image captured by the camera 77, and the operation ends.

More specifically, as described above in the case where the object type is the entire section of the whiteboard, the CPU 34 applies image processing that corrects lens distortion with a predetermined correction parameter, and image processing that corrects perspective distortion with a predetermined correction parameter, so as to output the captured image having a rectangular shape for the whiteboard.

When it is determined that the camera 77 faces downward ("NO" at S6), at S9, the CPU 34 determines that the type of the object is an image of an entire section of the presentation material placed on the conference table. At S10, the CPU 34 applies image processing specific to the entire section of the presentation material to a captured image captured by the camera 77, and the operation ends.

More specifically, as described above in the case where the object type is the entire section of the presentation material placed on the set surface, the CPU 34 applies image processing that corrects lens distortion with a predetermined correction parameter, and image processing that corrects perspective distortion with a predetermined correction parameter, so as to output the captured image having a rectangular shape for the presentation material. In this example, it is assumed that the presentation material has a rectangular shape.

Further, when it is determined that the camera 77 faces downward, the CPU 34 causes the light 78 to turn on to expose light to the object to be captured at the time of capturing the object.

When it is determined that there is no quadrilateral that is extracted from the imaging area to be captured ("NO" at S5), the operation proceeds to S11 to determine whether the camera 77 faces upward using the information regarding the inclination angle θ9 of the arm 74, and/or the inclination angle θ8 of the camera 77, in a substantially similar manner as described above referring to S6.

When it is determined that the camera 77 faces upward ("YES" at S11), at S12, the CPU 34 determines that the type of the object is a portion of the entire section of the whiteboard. At S13, the CPU 34 applies image processing specific to the portion of the whiteboard to a captured image captured by the camera 77, and the operation ends.

More specifically, as described above in the case where the object type is a portion of the whiteboard, the CPU 34 applies image processing that corrects lens distortion with a predetermined correction parameter, and image processing that corrects perspective distortion with a predetermined correction parameter, so as to output the captured image having a rectangular shape for the imaging area that is calculated.

When it is determined that the camera 77 faces downward ("NO" at S11), at S14, the CPU 34 determines that the type of the object is an image of a portion of the entire section of the presentation material. At S15, the CPU 34 applies image processing specific to the portion of the presentation material to a captured image captured by the camera 77, and the operation ends.

More specifically, as described above in the case where the object type is a portion of the presentation material, the CPU 34 applies image processing that corrects lens distortion with a predetermined correction parameter, and image processing that corrects perspective distortion with a predetermined correction parameter, so as to output the captured image having a rectangular shape for the imaging area that is calculated.

When the CPU 34 determines that the camera 77 is about to capture a portion of the whiteboard or the presentation material, that is, at S12 and S14, the CPU 34 is not able to apply processing that corrects perspective distortion using information regarding the quadrilateral, as there is no quadrilateral that is extracted. In such case, the CPU 34 performs operation of calculating an imaging area to be captured, which is described below referring to FIG. 9. For the descriptive purposes, it is assumed that there is no distortion caused by lens aberration.

The CPU 34 calculates an imaging area to be captured by the camera 77, while taking into account the height L of the camera 77 measured from the set surface.

Figure 9:
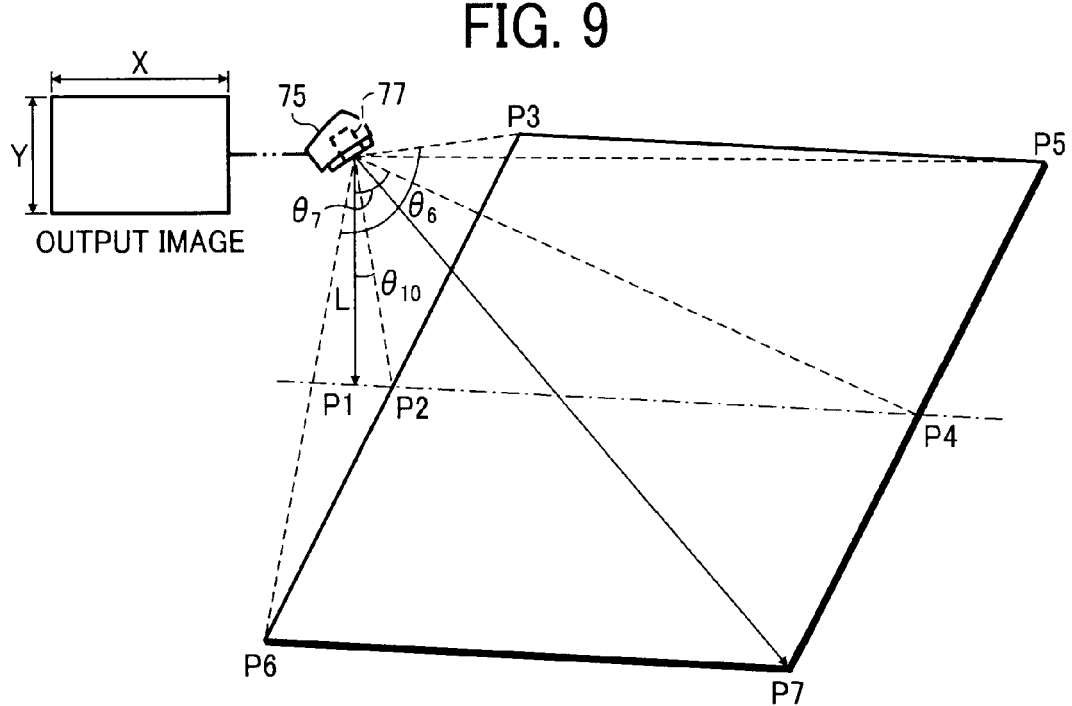
FIG. 9 is an illustration for explaining a imaging area that can be captured by the camera of the conference apparatus of FIG. 1.

In this example illustrated in FIG. 9, the camera 77 has a horizontal view angle θ6, and a vertical view angle θ7. The height L, which is a distance between the lens center and the set surface, is obtained from the equation 3 described above. The shooting direction of the camera is defined to be a direction downward by (90-θ10-θ6/2) degrees with respect to the horizontal direction. The angle θ10 is an angle defined by a line that intersects the lens center of the camera 77 and a point P1, and a line that intersects the lens center of the camera 77 and a point P2. The point P1 is a point in a vertical line that intersects the lens center. The point P2 is an origin of the imaging area in the horizontal direction.

The angle θ10 is calculated using the inclination θ8 of the camera 77 and the vertical horizontal angle θ7 of the camera 77, as follows.

$$\theta 10 = 90 \text{ degrees} - \theta 8 - \theta 7/2 \quad \text{(Equation 4)}$$

Referring to FIG. 9, the values of various lengths that relate to the imaging area are obtained as follows.

$$\text{Length}(P1-P2) = L \tan\theta 10 \quad \text{(Equation 5)}$$

$$\text{Length}(\text{Camera } 77-P2) = L \sec\theta 10 \quad \text{(Equation 6)}$$

$$\text{Length}(\text{Camera } 77-P3) = \text{Length}(\text{Camera } 77-P6) = L \sec\theta 10 * \sec(\theta 6/2) \quad \text{(Equation 7)}$$

$$\text{Length}(P2-P3) = \text{Length}(P2-P6) = L \sec\theta 10 * \tan(\theta 6/2) \quad \text{(Equation 8)}$$

$$\text{Length}(P1-P4) = L \tan(\theta 7 + \theta 10) \quad \text{(Equation 9)}$$

$$\text{Length}(\text{Camera } 77-P4) = L \sec(\theta 7 + \theta 10) \quad \text{(Equation 10)}$$

$$\text{Length}(P2-P4) = \text{Length}(P3-P5) = \text{Length}(P6-P7) = L(\tan(\theta 7 + \theta 10) - \tan\theta 10) \quad \text{(Equation 11)}$$

$$\text{Length}(P4-P5) = \text{Length}(P4-P7) = L \sec(\theta 7 + \theta 10) * \tan(\theta 6/2) \quad \text{(Equation 12)}$$

$$\text{Length}(\text{Camera } 77-P5) = (\text{Camera } 77-P6) = L \sec(\theta 7 + \theta 10) * \sec\theta 6/2) \quad \text{(Equation 13)}$$

The imaging area of the camera 77, which can be varied depending on the height L of the camera 77, is calculated as follows.

$$\text{Length}(P3-P6) = 2*(L \sec\theta 10 * \tan(\theta 6/2)) \quad \text{(Equation 14)}$$

$$\text{Length}(P5-P7) = 2*(L \sec(\theta 7 + \theta 10) * \tan(\theta 6/2)) \quad \text{(Equation 15)}$$

The length (P2–P4) is calculated using the equation 11. When compared between the length (P3–P6) and the length (P5–P7), the length (P5–P7) that is far from the camera 77 should be greater in actual length.

Each pixel in the captured image can be expressed in a coordinate value of the horizontal pixel value X and the vertical pixel value Y, such as (X1, Y1). Using the equations 16 and 17 below, the coordinate value (X1, Y1) of a target pixel can be converted to a coordinate value (X, Y) of the captured image having the origin at P2.

The horizontal pixel value X is calculated using the equation 16.

$$L \sec((\Theta 7 * Y1/Y) + \theta 10) * \tan(\theta 6 * X1/X) \quad \text{(Equation 16)}$$

The vertical pixel value Y is calculated using the equation 17.

$$L(\tan((\theta 7 * Y1/Y) + \theta 10) - \tan\theta 10) \quad \text{(Equation 17)}$$

The positions of the pixels in the captured image, which are respectively associated with the positions of the pixels in the imaging area using the equations 16 and 17, are subjected for image processing to correct perspective distortion. More specifically, the position of each pixel in the horizontal direction is corrected such that the distance between the adjacent pixels are equally spaced in the range of the length (P3–P6). The position of each pixel in the vertical direction is corrected such that the distance between the adjacent pixels are equally spaced in the range of the length (P2–P4). The corrected captured image looks natural as the object in the captured image is perceived as it is viewed from front.

After applying image processing specific to the specified object type to a captured image, the CPU 34 temporarily stores the corrected captured image in a memory as currently captured image data. In one example, the CPU 34 further encodes the captured image data, and causes the network I/F 306 to transmit the encoded image data through the network to the counterpart conference apparatus. The counterpart conference apparatus, which receives the encoded image data, causes a projector P to project an image based on the decoded image data onto a whiteboard provided at the other site. Alternatively or additionally, the CPU 34 causes the projector P at its own site to project an image based on the captured image data onto the whiteboard W.

As described above, the conference apparatus 1 specifies a type of an object being captured or to be captured by the camera 77, and applies image processing specific to the specified object type to a captured image. More specifically, the conference apparatus 1 specifies the object type using information regarding the height L of the camera 77 measured from the set surface, information regarding the inclination of the camera 77, and information regarding the inclination of the arm 74. Since the height L of the camera 77 is taken into account, the conference apparatus 1 is able to specify an object type with improved accuracy, even when the rotational center of the camera 77 is not fixed. This allows the conference apparatus 1 to apply image processing that is specific to the object type to a captured image, thus improving the quality of the captured image.

More specifically, the conference apparatus 1 adjusts various correction parameters including a correction parameter for correcting lens distortion, a correction parameter for correcting perspective distortion, and a correction parameter for correcting color tones, based on the specified object type. The resultant processed image data thus looks more natural, even when the image is taken using the wide-angle lens or from a different position.

Further, even when the conference apparatus 1 is not able to extract a boundary, such as a quadrilateral, from an imaging area being captured or to be captured, the conference apparatus 1 calculates an imaging area using information regarding the height L of the camera 77, information regarding the inclination of the camera 77, and information regarding angles of view such as a horizontal angle of view and a vertical angle of view. Since information regarding the height L is taken into account, the conference apparatus 1 is able to calculate the imaging area with improved accuracy.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, in the above-described example, the conference apparatus 1 performs post processing to the captured image to correct distortions, after taking the captured image. Additionally, the conference apparatus 1 may change an image capturing mode according to the specified object type, which may be selected from a macro mode, digital zoom mode, a digital pan tilt zoom mode, or auto focus mode.

Assuming that the object type is the presentation material placed on the conference table, the digital pan tilt zoom mode or the auto focus mode may be used. In such case, the CPU 34 may calculate a distance to the digital zoom area using the height L of the camera 77, and focus based on the calculated distance.

Further, in the above-described example, the first sensor S1 that is provided in the camera housing 1 and the second sensor S2 that is provided in the arm 74 are used to obtain information regarding the inclination of the camera section 7. Alternatively, the inclination detector S may be implemented by any desired structure. For example, a rotational sensor such as a potation meter or a rotary encoder may be provided at or near the hinge 73 or the support shafts 76 to detect the inclination of the camera 77 and the arm 74.

Further, any operation that is performed by the CPU 34 according to the image processing control program may be performed by one or more hardware apparatuses or a hardware/software combination. Further, any of the above-described devices or units can be implemented as a hardware apparatus, such as a special-purpose circuit or device, or as a hardware/software combination, such as a processor executing a software program.

For example, the image processing control program may be performed by a general-purpose computer to cause the computer to perform operation of FIG. 12. In such case, the computer receives inclination information regarding the inclination of the camera 77 and the inclination of the arm 74 from the inclination detector S of the conference apparatus 1. After specifying the type of the object subjected for capturing by the camera 77, the computer applies image processing specific to the specified object type to a captured image captured by the camera 77. In this situation, the conference apparatus 1 does not have to be provided with the image processing control program as described above such that it may function as an image capturing device having a camera that captures an image to be processed by the computer that performs image processing according to the image processing control program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, the present invention may reside in: an image processing apparatus including: a camera that captures an object; a support body provided on a set surface; an arm that supports the camera so as to cause the camera to be vertically rotatable, the arm being supported by the support body in a manner that is rotatable in an upward or downward direction with respect to the support body; an inclination detector to detect an inclination of the arm and an inclination of the camera to output inclination information; and a processor to calculate a height of the camera from the set surface using the inclination information and dimensional information of the image processing apparatus, specify a type of the object based on the calculated height and the inclination information, and apply image processing specific to the specified object type to a captured image captured by the camera.

In one example, the inclination detector includes a first sensor provided in the camera housing, and a second sensor provided in the arm section such as in the arm or at a connector that connects the arm with the support body. The first sensor outputs camera inclination information indicating a detected inclination of the camera. The second sensor outputs arm inclination information indicating a detected inclination of the arm.

The image processing being applied includes image processing that corrects perspective distortion of the captured image. The processor changes a correction parameter for correcting perspective distortion, based on the specified object type.

The processor further determines whether a quadrilateral is extracted from an imaging area of the camera. When the processor determines that the quadrilateral is extracted, the processor applies image processing that corrects perspective distortion so as to cause the extracted quadrilateral to be a rectangular shape.

The image processing being applied includes image processing that corrects lens distortion of the captured image. The processor changes a correction parameter for correcting lens distortion, based on the specified object type.

The image processing being applied includes image processing that corrects color tone. The processor changes a correction parameter for correcting color tone, based on the specified object type.

The image processing apparatus further includes a light, which irradiates light toward the object.

The inclination detector includes an accelerometer.

The image processing apparatus further includes a network interface to transmit the captured image to which the image processing is applied to an outside apparatus through a network.

The image processing apparatus further includes an input/output interface to transmit the captured image to which the image processing is applied to a projector to cause the projector to display the captured image onto a display.

In one example, the present invention may reside in an image processing system including any one of the above-described image processing apparatus and a projector.

In one example, the present invention may reside in an image processing method, performed by an image processing apparatus, the image processing apparatus including a camera that captures an object; a support body provided on a set surface; an arm that supports the camera so as to cause the camera to be vertically rotatable, the arm being supported by the support body in a manner that is rotatable in an upward or downward direction with respect to the support body; and an inclination detector to detect an inclination of the arm and an inclination of the camera to output inclination information. The method comprising: receiving the inclination information; calculating a height of the camera from the set surface using the inclination information and dimensional information of the image processing apparatus; specifying a type of the object based on the calculated height and the inclination information; and applying image processing specific to the specified object type to a captured image captured by the camera.

In one example, the present invention may reside in a non-transitory recording medium storing a plurality of instructions which, when executed by a processor, cause the processor to perform the above-described image processing method.

What is claimed is:

1. An image processing apparatus, comprising:
   a camera to capture an image of an object;
   a support body to set the image processing apparatus on a set surface;
   an arm section including an arm, the arm having one end rotatably attached to a top surface of the support body and the other end rotatably attached to a camera housing incorporating therein the camera;
   a first sensor provided in the camera housing and configured to detect an inclination of the camera to output camera inclination information indicating the inclination of the camera;
   a second sensor provided in the arm section and configured to detect an inclination of the arm to output arm inclination information indicating the inclination of the arm; and
   a processor to:
      calculate a height of the camera indicating a distance between a center of the camera and the set surface, using dimensional information of the image processing apparatus, the camera inclination information, and the arm inclination information;
      specify a type of the object subjected for capturing by the camera using the height of the camera, the camera inclination information, and the arm inclination information; and
      apply image processing specific to the specified type of the object performed captured image captured by the camera to generate processed image data.

2. The image processing apparatus of claim 1, wherein the image processing performed applied by the processor includes image processing that corrects perspective distortion of the captured image with a correction parameter, the correction parameter being changed based on the specified type of the object.

3. The image processing apparatus of claim 2, wherein the processor is further configured to:
   extract a quadrilateral from an imaging area of the camera; and
   determine the correction parameter for correcting perspective distortion so as to cause the extracted quadrilateral to be a rectangular shape.

4. The image processing apparatus of claim 2, wherein the processor is further configured to:
   calculate an imaging area of the camera using at least the height of the camera and information indicating an angle of view of the camera; and
   determine the correction parameter for correcting perspective distortion so as to cause the calculated imaging area to be a rectangular shape.

5. The image processing apparatus of claim 2, wherein the image processing performed applied by the processor further includes image processing that corrects lens distortion of the captured image with a correction parameter, the correction parameter being changed based on the specified type of the object.

6. The image processing apparatus of claim 5, wherein the image processing preformed applied by the processor further includes image processing that corrects color tone of the captured image with a predetermined correction parameter, the correction parameter being changed based on the specified type of the object.

7. The image processing apparatus of claim 1, further comprising:
   a light to irradiate light toward the object subjected for capturing, wherein the processor causes the light to turn on or off according to the specified type of the object.

8. The image processing apparatus of claim 1, further comprising:
   a network interface to transmit the processed image data to an outside apparatus through a network.

9. The image processing apparatus of claim 1, further comprising:
   an output interface to transmit the processed image data to a projector to cause the projector to display an image based on the processed image data.

10. The image processing apparatus of claim 1, wherein when the processor determines that the height of the camera is substantially equal to a height of the camera that is obtained when the camera housing and the arm section are both in stand-up positions, the processor specifies that the object subjected for capturing is a human or a scenery, and when the processor determines that the height of the camera is not substantially equal to the height of the camera that is obtained when the camera housing and the arm section are both in the stand-up positions, the processor specifies that the object subjected for capturing is a presentation material or an image of a presentation material.

11. An image processing method, performed by a processor that applies image processing to a captured image captured by an image capturing device, wherein the image capturing device includes: a camera to capture an image of an object; a support body to set the image capturing device on a set surface; an arm section including an arm, the arm having one end rotatably attached to a top surface of the support body and the other end rotatably attached to a housing incorporating therein the camera; and means for detecting an inclination of the camera and an inclination of the arm to output inclination information, the method comprising:

receiving the inclination information indicating the inclination of the camera and the inclination of the arm;

calculating a height of the camera indicating a distance between a center of the camera and the set surface, using dimensional information of the image capturing device and the inclination information;

specifying a type of the object subjected for capturing by the camera using the height of the camera and the inclination information; and applying image processing specific to the specified type of the object to a captured image captured by the camera to generate processed image data.

12. The image processing method of claim 11, wherein the applying image processing includes:

applying image processing that corrects perspective distortion of the captured image with a correction parameter, the correction parameter being changed based on the specified type of the object.

13. The image processing method of claim 12, further comprising:

extracting a quadrilateral from an imaging area of the camera; and determining the correction parameter for correcting perspective distortion so as to cause the extracted quadrilateral to be a rectangular shape.

14. The image processing method of claim 12, further comprising:

calculating an imaging area of the camera using at least the height of the camera and information indicating an angle of view of the camera; and determining the correction parameter for correcting perspective distortion so as to cause the calculated imaging area to be a rectangular shape.

15. The image processing method of claim 12, wherein the applying image processing further includes:

applying image processing that corrects lens distortion of the captured image with a correction parameter, the correction parameter being changed based on the specified type of the object.

16. A non-transitory recording medium storing a plurality of instructions which, when executed by a processor that applies image processing to a captured image captured by an image capturing device, cause the processor to perform an image processing method, wherein the image capturing device includes: a camera to capture an image of an object; a support body to set the image capturing device on a set surface; an arm section including an arm, the arm having one end rotatably attached to a top surface of the support body and the other end rotatably attached to a camera housing incorporating therein the camera; and means for detecting an inclination of the camera and an inclination of the arm to output inclination information, the method comprising:

receiving the inclination information indicating the inclination of the camera and the inclination of the arm;

calculating a height of the camera indicating a distance between a center of the camera and the set surface, using dimensional information of the image capturing device and the inclination information;

specifying a type of the object subjected for capturing by the camera using the height of the camera and the inclination information; and applying image processing specific to the specified type of the object to a captured image captured by the camera to generate processed image data.

\* \* \* \* \*